Patented Aug. 15, 1944

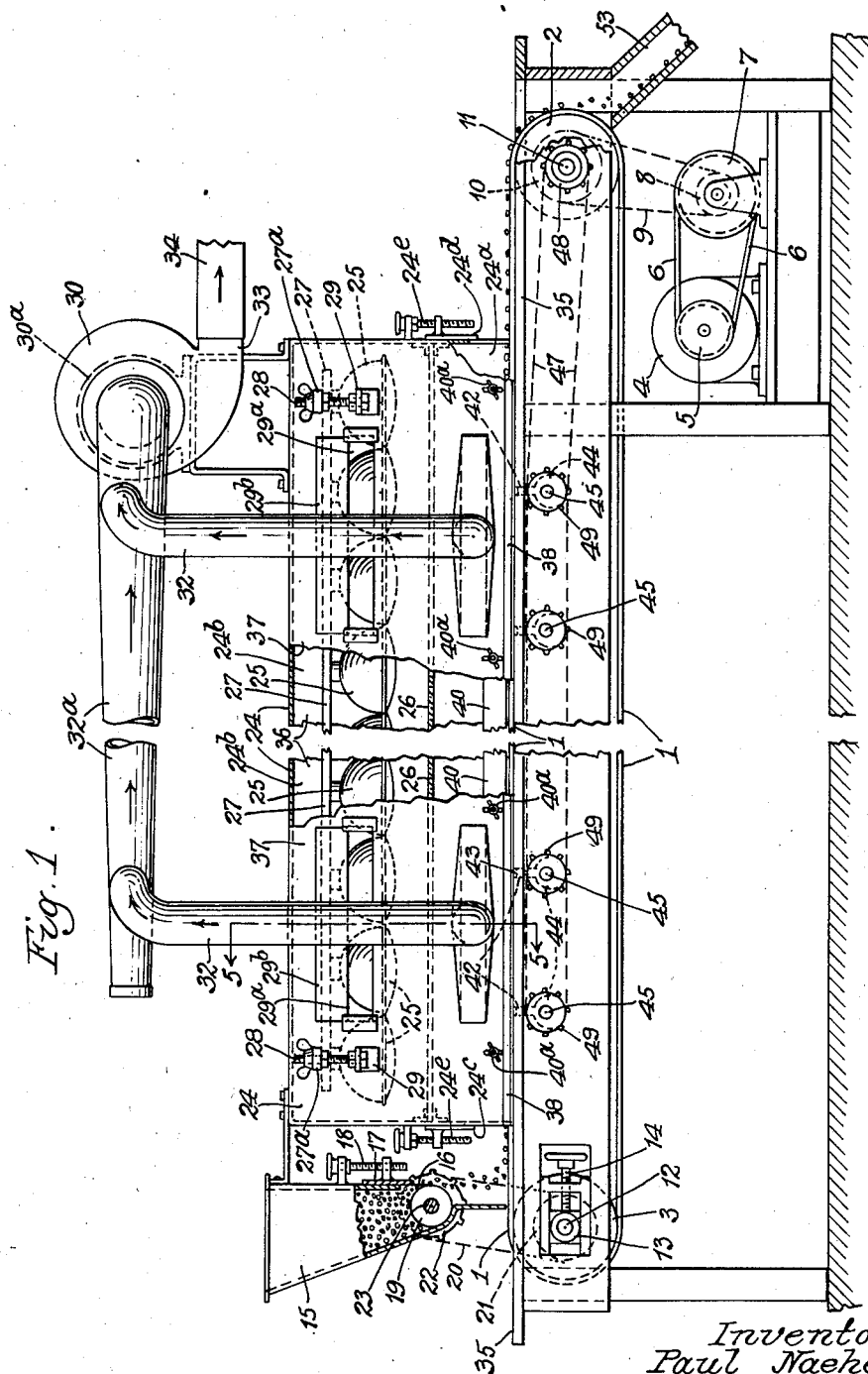

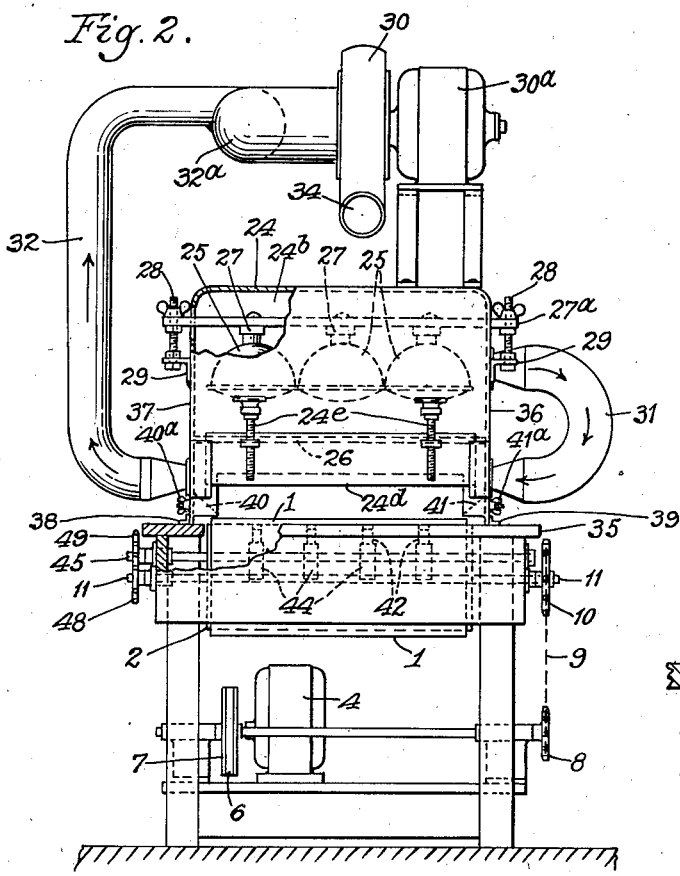

2,355,671

UNITED STATES PATENT OFFICE 2,355,671

APPARATUS FOR TREATING GERMS OF WHEAT

Paul Naeher and William M. Williams, Evanston, Ill., assignors to B. F. Gump Co., Chicago, Ill., a corporation of Illinois Application October 31, 1942, Serial No. 464,044

10 Claims. (Cl. 34—233)

This invention relates to an apparatus for treating the germs of wheat and has for its object to provide a new and improved apparatus for this purpose.

The invention has as a further object to provide an apparatus for treating the germs of wheat by the use of infra-red rays. In making flour from wheat, it has heretofore been the practice to remove the wheat germs. These wheat germs contain oil and the particles adhere. Heretofore these germs have been removed by running the material containing them, such as the germ middlings, through rollers, whereupon the germs flatten out instead of becoming pulverized, and are then removed by running the material through a sieve. The flat germs, being larger than the pulverized material, do not pass through the sieve and are then easily removed. One of the objects of the present invention is to treat these germs so that they can be readily pulverized and become a part of the flour, as they contain vitamins and mineral elements vitally important for the diet of human beings.

The invention has as a further object to provide an apparatus for treating germs of wheat by infra-red rays and for removing the moisture from the oil therein while being treated.

The invention has as a further object to provide an apparatus for treating wheat germs while in the middlings by infra-red rays and for removing the moisture and dust while the middlings are being treated.

The invention has as a further obejct to provide a mechanism for treating wheat germs by moving them in a continuous horizontal direction and simultaneously directing infra-red rays upon them.

The invention has as a further object to provide an apparatus for treating wheat germs by placing them upon a conveyor and directing infra-red rays upon the wheat germs as the conveyor is traveling along.

The invention has as a further object to provide a mechanism for treating wheat germs by infra-red rays and utilizing the air heated by the infra-red lamps to assist in heating and drying the wheat germs.

The invention has as a further object to agitate the wheat germs while they are on the conveyor so that the infra-red rays may contact all of the surfaces thereof.

The present application illustrates a mechanism adapted to carry out the method first described in copending application, 406,662, filed on the 13th day of August, 1941.

The invention has further objects which are more particularly pointed out in the accompanying description.

Referring now to the drawings, Fig. 1 is a side elevation of one form of the device embodying the invention;

Fig. 2 is an end elevation of the device shown in Fig. 1;

Fig. 3 is an enlarged view showing one form of device for agitating the conveyor and the wheat germs thereon;

Fig. 4 is a view showing a modified form of device for agitating the belt and the wheat germs thereon.

Fig. 5 is a sectional view taken on line 5—5 of Fig. 1.

Like numerals refer to like parts throughout the several figures.

In the construction herein shown, there is provided a conveyor 1 which passes over the rollers 2 and 3 and which is moved by means of a motor 4. This motor is preferably connected to the conveyor by a variable speed mechanism of any desired form. As herein shown, the motor is provided with a pulley 5, over which runs a belt 6 which passes over a pulley 7. Connected with the pulley 7 is a pulley 8. A belt 9 passes over this pulley and engages a pulley 10 on a shaft 11 of the roller 2, over which the conveyor 1 passes. The shaft 12 of the roller 3 is mounted in an adjustable bearing 13 which is adjusted by means of a screw 14, so as to vary the tension of the conveyor.

The wheat germs or the middlings containing the wheat germs are placed on the conveyor in any desired manner. As herein shown, there is a hopper 15 into which the wheat germs, or the middlings containing the wheat germs, are placed. This hopper is provided with an adjustable feed mechanism comprising a feed or discharge opening 16 and a movable control member 17 for said opening which is adjusted to vary the size of the opening by the adjusting screw 18. There is a roller 19 opposite the opening 16 which insures the discharge of the material through this opening, the material being deposited upon the conveyor 1. This roller is operated by means of a belt 20 which passes around a pulley 21 on the shaft 12 of the roller 3 and around a pulley 22 on the shaft 23 of the roller 19.

Located above the conveyor 1 is a housing 24, open at the bottom and containing a series of infra-red lamps 25. The housing 24 is supported in any desired manner and the conveyor 1 acts as a closure for the open bottom of the housing and is moved along under the housing, with the material to be treated thereon so that this material is subjected to the rays of the infra-red lamps. There is sufficient room between the lower edges of the front and rear walls of the housing and the top of the conveyor to permit the material on the conveyor to pass these edges. The lower portions 24c and 24d of the front and rear walls of the housing 24 are adjustable with relation to the conveyor by means of the adjusting screws 24e so that they may be properly adjusted to clear the material on the conveyor passing thereunder and to also provide, if desired, a sufficient space between the lower edges of these walls and the top of the material on the conveyor to provide a natural ventilation of the chamber 24a as hereinafter set out. The lower edges of the side walls of the housing are arranged to prevent the material on the conveyor from leaving the conveyor at the sides as the conveyor moves along the housing. When in operation the housing receives considerable dust and moisture which must not be permitted to settle upon the infra-red lamps as this would greatly reduce the efficiency thereof. There is, therefore, provided an infra-red ray transmitting dust shield 26 between the infra-red lamps 25 and the conveyor 1, which divides the housing 24 into two chambers, one chamber, 24a, which is just above the conveyor 1, and the other chamber, 24b, which contains the infra-red lamps, so that the lamps are practically in a sealed chamber 24b formed by the upper part of the housing 24 and the shield 26 and, therefore, out of the dust and moisture contained in the chamber 24a.

The infra-red lamps 25 are preferably adjustable vertically to vary their distance from the conveyor 1. As herein shown, this adjustment is secured by mounting these lamps upon supports 27, 27a which are adjustable vertically by means of the adjusting screws 28 which are connected to the supports and to a fixed member 29 attached to the walls of the housing 24.

The infra-red lamps develop heat which must be removed from the chamber 24b to preserve the lamps and their connections. This is accomplished by drawing air from the outside atmosphere through the air intake 29a by a suction fan 30 operated by a motor 30a thereby continually replacing the heated air in the chamber 24b by cooler outside air. This heated air is utilized for heating and drying the wheat germs in chamber 24a. The heated air passes out of the chamber 24b and into the chamber 24a through the connecting pipe or pipes 31 and contacts the germs on the conveyor 1. The heated air, dust and moisture in the chamber 24a passes out of said chamber through the pipes 32 into the pipe 32a which connects with the suction fan 30. The size of the air intake openings 29a may be varied by means of the shutters 29b.

The discharge 33 of the fan is connected with a pipe 34 which may lead to any point desired, such as a dust collector. After the dust is removed, the heated air can be utilized in any manner desired as, for example, for heating a room.

Some means is provided for agitating the material on the conveyor 1 so as to pass it along under the infra-red lamps. The rays from the lamps will contact all parts of the various particles of the material on the conveyor.

The conveyor may be supported in any desired manner and the manner of supporting it will depend in a large measure on the material from which the conveyor is made. In the drawings I have shown one form of conveyor which is supported by a support 35, the conveyor running along this support so that it is kept substantially straight and level throughout the portion of its travel beneath the infra-red lamps.

The side walls 36 and 37 of the housing are supported upon the support in any suitable manner, as by the angle members 38 and 39.

Located on the interior of the housing are the guides 40 and 41 which are preferably adjustably fastened in position, as by the adjustable fastening devices 40a and 41a which work in slots in the side walls 36 and 37. These guards have inclined faces and project inwardly beyond the edges of the conveyor 1. They insure the material being maintained on the conveyor 1.

A series of agitating members 42 are arranged at intervals along the conveyor, opposite openings 43 in the support 35 and through which the lower face of the conveyor is exposed, as shown in Figs. 1 and 3.

The agitating members may be moved in any desired manner as, for example, by means of eccentrics 44 mounted on shafts 45, there being eccentric rings 46 to which the agitating members 42 are connected. As the shafts 45 are rotated, the agitating members 42 move up and down engaging the conveyor 1 and moving it so as to agitate the wheat germs thereon to turn them so that the rays from the infra-red lamps contact with all parts of the wheat germs to insure their being thoroughly treated.

The shafts 45 are rotated in any desired manner. As herein shown, they are driven by a belt 47, preferably a sprocket chain driven from a sprocket wheel 48 on the conveyor shaft 11. This sprocket chain has a driving connection with the driving sprockets 49 on the shafts 45.

It will thus be seen that as the shafts 45 are rotated the agitating members 42 are moved up and down so as to engage the conveyor and move it to move the wheat germs to various positions so that the infra-red rays will strike all of the surface areas thereof.

There is illustrated in Fig. 4 another form of agitating device which consists of an agitating member in the form of a cam 50 mounted on a shaft 51. The support 35 is provided, in this case, with elongated openings 52 in which the cams 50 move and through which the bottom of the conveyor is exposed. There will, of course, be a series of these agitating devices located at proper distances along the conveyor.

The oil of the wheat germs, which causes the particles of the wheat germs to cohere when passed through the rollers, has the moisture removed by this treatment so as to change the character and condition of the germs from an adhering mass, the particles of which stick together to form flattened pieces, to a friable condition where the particles are reduced to a powder when passed through the rolls so as to become part of the flour from which bread is made. The treated material passes into a chute 53 and is delivered to any point desired.

Whereas the above mechanism has been described as used in connection with treating wheat germs, it will be understood that it is intended to be employed with other granular material, such as the germs of other grains or seeds, meal containing various germs, and entire grains or seeds.

We claim:

1. An apparatus for treating granular material, comprising a housing, open at the bottom, a movable conveyor forming a continuous movable closure for the open bottom of the housing, but spaced away from the lower front and rear edges of the housing, and upon which the granular material is placed, a plurality of infra-red lamps in said housing arranged to direct infra-red rays upon the granular material, means for moving said conveyor along beneath said infra-red lamps so that the rays of the infra-red lamps successively contact the said granular material, movable agitating members at intervals along said conveyor which engage said conveyor and move it so as to agitate said granular material so as to change the portions thereof contacted by the infra-red rays.

2. An apparatus for treating granular material comprising a housing, open at the bottom, a movable conveyor forming a continuous closure for the open bottom of the housing, upon which the granular material is placed, a support for said conveyor upon which the portion of the conveyor opposite the open bottom of the housing is supported, a plurality of infra-red lamps in said housing arranged to direct infra-red rays upon said granular material, means for moving said conveyor along beneath the infra-red lamps so that the rays of the infra-red lamps successively contact said granular material, and agitating devices at intervals along said conveyor for agitating it to change the position thereon of said granular material.

3. An apparatus for treating granular material comprising a housing, open at the bottom, a movable conveyor forming a continuous closure for the open bottom of the housing, upon which granular material is placed, a support for said conveyor, upon which the portion of the conveyor opposite the open bottom of the housing is supported, said support being provided with openings at intervals therealong, agitating members extending into said openings and engaging the conveyor, means for moving said agitating members to move the conveyor to agitate said granular material, a plurality of infra-red lamps in said housing arranged to direct infra-red rays upon the granular material, and means for moving said conveyor along beneath said infra-red lamps so that the rays of the infra-red lamps successively contact said granular material.

4. An apparatus for treating granular material comprising a housing, open at the bottom, a movable conveyor forming a continuous movable closure for the open bottom of the housing, but spaced away from the lower front and rear edges of the housing, and upon which the granular material is placed, a support for said conveyor, upon which the portion of the conveyor opposite the open bottom of the housing is supported, said support provided with openings at intervals therealong, agitating members extending into said openings and engaging the conveyor, means for moving said agitating members to move the conveyor to agitate said granular material, a plurality of infra-red lamps in said housing arranged to direct infra-red rays upon the granular material, means for moving said conveyor along beneath said infra-red lamps so that the rays of the infra-red lamps successively contact said granular material, an infra-red ray transmitting member extending across said housing intermediate the infra-red lamps and the conveyor, dividing the housing into two chambers, and means for changing the air in said two chambers.

5. An apparatus for treating granular material comprising a housing, open at the bottom, a conveyor opposite the open bottom of the housing upon which the granular material is placed, means for moving said conveyor along said housing, a plurality of infra-red lamps in said housing arranged to direct infra-red rays upon the granular material as the conveyor is moved along said housing, an infra-red ray transmitting dust shield between the infra-red lamps and the conveyor which divides the housing into two chambers, one above the conveyor and containing the granular material and the other enclosing the infra-red lamps, and means for passing the air heated by the infra-red lamps into and through the chamber containing the granular material so as to utilize this heat to assist in heating and drying the granular material.

6. An apparatus for treating granular material comprising a housing, a conveyor upon which the granular material is placed, means for moving said conveyor along said housing, a plurality of infra-red lamps in said housing arranged to direct infra-red rays upon the granular material as the conveyor is moved along said housing, an infra-red ray transmitting dust shield between the infra-red lamps and the conveyor which divides the housing into two chambers, one above the conveyor and containing the granular material and the other enclosing the infra-red lamps, and means for passing the air heated by the infra-red lamps into and through the chamber containing the granular material so as to utilize this heat to assist in heating and drying the granular material.

7. An apparatus for treating granular material comprising a housing, a granular material moving member mounted in said housing, means for delivering granular material to said member, an infra-red electric lamp above said member and means for directing the rays from said lamp upon said member and upon the granular material thereon, means for defining a chamber in which said lamp is housed, including a wall, pervious to infra-red radiation, between said infra-red lamp and said member, and means for moving heated air from said chamber into contact with said granular material.

8. An apparatus for treating granular material comprising a housing, an endless conveyor, means for delivering granular material to said endless conveyor for conveyance along the housing, an infra-red lamp in said housing and above said conveyor, and means for directing rays from said lamp upon said conveyor and upon the granular material thereon, means for defining a chamber in which said lamp is housed, including a wall, pervious to infra-red radiation, between said infra-red lamp and said conveyor, and means for moving heated air from said chamber into contact with said granular material on said conveyor.

9. An apparatus for treating granular material comprising a conveyor, means for delivering granular material to said conveyor for movement by said conveyor, a member pervious to infra-red radiation, located above said conveyor and means, including said pervious member and said conveyor, for defining a chamber through which the granular material passes, an infra-red lamp located on the opposite side of said pervious member from the conveyor, and means for directing the rays from said lamp through said pervious member and upon the granular material, and means for directing air heated by said lamp to the said chamber and into contact with said granular material.

10. An apparatus for treating granular material comprising a conveyor, means for delivering granular material to said conveyor for movement thereby, a member pervious to infra-red radiation, located above said conveyor, an infra-red lamp located on the opposite side of said pervious member from the conveyor, means for directing rays from said lamp through said pervious member and upon the granular material, and means for directing air heated by said lamp to the space between said pervious member and the conveyor, and into contact with said granular material.

PAUL NAEHER.
WILLIAM M. WILLIAMS.